United States Patent
Kuperman (10) Patent No.: US 11,183,940 B2
(45) Date of Patent: Nov. 23, 2021

(54) CIRCUIT AND METHOD FOR CONTROLLING A HIGH-FREQUENCY RESONANT POWER CONVERSION SYSTEM HAVING COMPONENTS WITH FLUCTUATING PARAMETERS

(71) Applicant: B.G. NEGEV TECHNOLOGIES & APPLICATIONS LTD., AT BEN-GURION UNIVERSITY, Beer-Sheva (IL)

(72) Inventor: Alon Kuperman, Beer-Sheva (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 16/807,486

(22) Filed: Mar. 3, 2020

(65) Prior Publication Data
US 2021/0006175 A1 Jan. 7, 2021

Related U.S. Application Data

(60) Provisional application No. 62/870,692, filed on Jul. 4, 2019.

(51) Int. Cl.
*H02M 5/08* (2006.01)
*H02M 5/16* (2006.01)
*H02M 5/297* (2006.01)
*H02M 1/44* (2007.01)

(52) U.S. Cl.
CPC .............. *H02M 5/16* (2013.01); *H02M 1/44* (2013.01); *H02M 5/08* (2013.01); *H02M 5/297* (2013.01)

(58) Field of Classification Search
CPC ............ H02M 5/16; H02M 1/44; H02M 5/08; H02M 5/297; H02M 1/4241; H02M 5/06; H02M 5/12
See application file for complete search history.

(56) References Cited

U.S. PATENT DOCUMENTS

| 2012/0063179 A1* | 3/2012 | Gong ............... H02M 1/12 363/40 |
| 2017/0057793 A1* | 3/2017 | Dwari ............... H02J 50/12 |
| 2019/0131888 A1* | 5/2019 | Zhong ............... H02M 1/08 |

OTHER PUBLICATIONS

Guerrero et al., "Output Impedance Design of Parallel-Connected UPS Inverters With Wireless Load-Sharing Control" *IEEE Transactions on Industrial Electronics*, vol. 52, No. 4: 1126-1135 (Aug. 2005).

(Continued)

*Primary Examiner* — Gary L Laxton
(74) *Attorney, Agent, or Firm* — Nixon & Vanderhye P.C.

(57) ABSTRACT

A high-frequency resonant power conversion system for transferring power from an oscillator to a load or vice-versa, the system including components with at least one fluctuating parameter and is configured to control the value of a defined variable selected from: a certain current, a certain voltage, a phase difference between a certain voltage and a certain current, and a certain power; the system further including a virtual impedance creation loop which is configured to create a virtual component, the virtual component forming a basis for changing amplitude and a phase of the oscillator, thereby to compensate for a deviation from the controlled variable due to the fluctuations.

6 Claims, 7 Drawing Sheets

(56) References Cited

OTHER PUBLICATIONS

Zhong et al., "Control of Inverters Via a Virtual Capacitor to Achieve Capacitive output Impedance" *IEEE Transactions on Power Electronics*, vol. 29, No. 10: 5568-5578 (Oct. 2014).
Zhong et al., "Universal Droop Control of Inverters With Different Types of Output Impedance" *IEEE Access*, vol. 4: 702-712 (2016).

\* cited by examiner

CIRCUIT AND METHOD FOR CONTROLLING A HIGH-FREQUENCY RESONANT POWER CONVERSION SYSTEM HAVING COMPONENTS WITH FLUCTUATING PARAMETERS

This application claims priority to U.S. Provisional Patent Application No. 62/870,692 filed on Jul. 4, 2019, the entire contents of each of which are hereby incorporated by reference.

FIELD OF THE INVENTION

The invention relates in general to high-frequency power conversion systems. More specifically, the field of the invention relates to a control of a high-frequency resonant power conversion system which includes components having fluctuating parameters.

BACKGROUND OF THE INVENTION

High-frequency resonant (RLC) power conversion technology is widely used for an efficient transfer of power from a source to a load.

A typical resonant power conversion system (hereinafter also referred to as "high-frequency power conversion system"), in its basic form, includes a high-frequency (bi-directional, in general) power source (also referred to as "oscillator")—the frequency of the oscillator is typically in the order of several KHz to several MHz, one or more additional linear components, and a (bi-directional, in general) load.

Additional components (i.e., those that are not the load itself, hereinafter referred to as "additional components") may be, for example, one or more of resistors, inductors, capacitors, transformers, etc. In a most typical case, and in order to maximize the power transfer to/from the load itself, the high-frequency power conversion system is commonly designed to operate in the vicinity of resonance. More particularly, when dealing with a pure resistive load, the general desire is e.g., to reduce or cancel any reactive impedance from the "point of view" of the source (e.g. to cause the source to "see" nearly pure resistive load, and in fact to nearly match the phase of the voltage and the current on the load). In other alternatives, and for some other considerations, there are cases where the high-frequency power conversion system is designed to maintain another factor constant, such as: certain current, certain voltage, or phase difference between certain voltage and certain current, etc.

One type of a high-frequency resonant power conversion system in which it is desired to maximize the power transfer to a load is a high-power induction-based heater, for example, an electromagnetic levitation system (hereinafter, "levitation system"). Levitation systems are used in the metallurgy industry to melt objects in alloy production processes. In another example, induction-based and capacitive-based technologies are now developing for wirelessly charging electrical vehicles (hereinafter "wireless charging systems"). Such wireless charging systems are designed to include charging plates along roads that wirelessly connect to energy receivers within vehicles. In still another example, although dealing with a significantly lower scale of power transfer, induction-based systems are also used in kitchen-cooktops for the heating of food containers.

In the above examples, it is typically desired to maximize the power delivered to the load, the efficiency, or both. This is accomplished by designing the system to operate in the vicinity of resonance. As noted, there are other cases where the high-frequency power conversion system is designed to maintain another factor constant, such as certain current, certain voltage, or phase difference between certain voltage and certain current, etc. However, there are a variety of power conversion systems in which the parameters of either the additional components, or of the load itself fluctuate, removing the system from resonance, or otherwise, deviating the system from its assigned controlled factor. Such fluctuating parameters may include one or more of: resistance, induction (direct or mutual), or capacitance.

In a case of a resonance requirement, the prior art has suggested several ways to return the circuit to resonance when fluctuation of components parameters occur. A first prior art method suggests the use of one or more variable capacitors or inductors. However, this method which requires use of additional physical variable components is cumbersome, often inaccurate, and is not applicable for all practical cases. Another prior art method suggests returning the circuit to resonance by changing the frequency of the oscillator (namely the frequency of the AC source). This method, however, is also not applicable in all cases, and suffers from significant drawbacks. For example, in a case of a high-power system, and in order to prevent disturbances to the close environment, the frequency and the spectrum which is allocated to such high-power systems are very limited by regulations, and should not be changed. Therefore, when the change of frequency is forbidden or limited, the performance of the system has to be compromised. The same limitations and drawbacks, are in fact pertinent also to the other alternatives discussed above where another factor is controlled (such as certain current, certain voltage, or phase difference between certain voltage and certain current).

In another aspect, the use of a virtual impedance is known, and was first described in Guerrero et al, "*Output impedance design of parallel-connected UPS inverters with wireless load-sharing control*" IEEE Trans. Ind. Electron, vol. 52, no. 4, pp. 1126-1135, August 2005. This article describes how a plurality of uninterruptible power system (UPS) inverters can be connected in parallel such that each UPS contributes to the combined network a proportion of power relative to total power which is supplied by all inverters that are connected to the network. In a similar manner, a plurality of power generators can be connected in parallel, such as a generator of a 50/60 Hertz main electric supplier and a renewable energy generator. In order to avoid inclusion of physical inductors while connecting the different types of the electric power suppliers, Guerrero suggested the use of a virtual inductive impedance, which is in fact created by a change of one or more of the amplitude or the phase of a power inverter with respect to the others. Since then, the use of a virtual impedance by the prior art was limited to the field of a parallel connection of AC power supply sources in 50/60 Hz networks, while avoiding the necessity for physical reactive components. A similar application to the field of AC power supply sources in 50/60 Hz networks which utilizes a virtual capacitive impedance was proposed in Zhong et al, "*Control of inverters via a virtual capacitor to achieve capacitive output impedance*" IEEE Trans. Power Electron, vol. 29, no. 10, pp. 5568-5578, October 2014. The main goal of the application was to increase the quality of load voltage waveform. Virtual resistive impedance was proposed in Zhong et al, "*Universal droop control of inverters with different types of output impedance*" IEEE Access, vol. 4, pp. 702-712, February 2016 as a solution for parallel connection of AC power supply sources in 50/60 Hz networks, while avoiding the necessity for physical reactive components.

It is therefore an object of the present invention to provide a method and system for compensating for parameter fluctuations in components of high-frequency power conversion systems.

It is still another object of the present invention to provide a method and system for compensating for parameter fluctuations in components of high-frequency power conversion systems, in a manner that avoids the necessity for a change of the frequency of the oscillator.

It is still another object of the present invention to provide a method and system for compensating for parameter fluctuations in components of a high frequency power conversion system, while avoiding the necessity for adding physical components (either constant or variable) for the purpose of compensation purpose.

Other objects and advantages of the invention will become apparent as the description proceeds.

SUMMARY OF THE INVENTION

The invention relates to a high-frequency resonant power conversion system for transferring power from an oscillator to a load or vice-versa, the system comprising components with at least one fluctuating parameter and is configured to control the value of a defined variable selected from: a certain current, a certain voltage, a phase difference between a certain voltage and a certain current, and a certain power; the system further comprising a virtual impedance creation loop which is configured to create a virtual component, said virtual component forming a basis for changing amplitude and a phase of the oscillator, thereby to compensate for a deviation from the controlled variable due to said fluctuations.

In an embodiment of the invention, the phase difference between the oscillator and the load is constant or follows a known reference, to provide operation of the system in a desired mode of operation.

In an embodiment of the invention, the created virtual component is a virtual capacitor.

In an embodiment of the invention, the virtual impedance creation loop comprising a processor for calculating, based on said controlled variable and on circuit measured values, a positive or negative capacitance value, that if added to the system, would have returned the system to its controlled variable reference value.

In an embodiment of the invention, the virtual impedance creation loop comprising an integration unit.

In an embodiment of the invention, the virtual impedance creation loop comprising an integration unit having the form $1/c\int i_s dt$, wherein C is the calculated positive or negative capacitance value, and said $i_s$ is a sampled current from the system, and the result of the integration is a voltage which forms a basis for changing said amplitude and phase of the oscillator.

In an embodiment of the invention, the system is an inductive or capacitive-coupling based system.

In an embodiment of the invention, the induction-based system is a levitation system.

BRIEF DESCRIPTION OF THE DRAWINGS

In the drawings.

FIG. 4b shows an equivalent circuit of the principle circuit of FIG. 4a; and

DETAILED DESCRIPTION OF PREFERRED EMBODIMENTS

Figure 1:
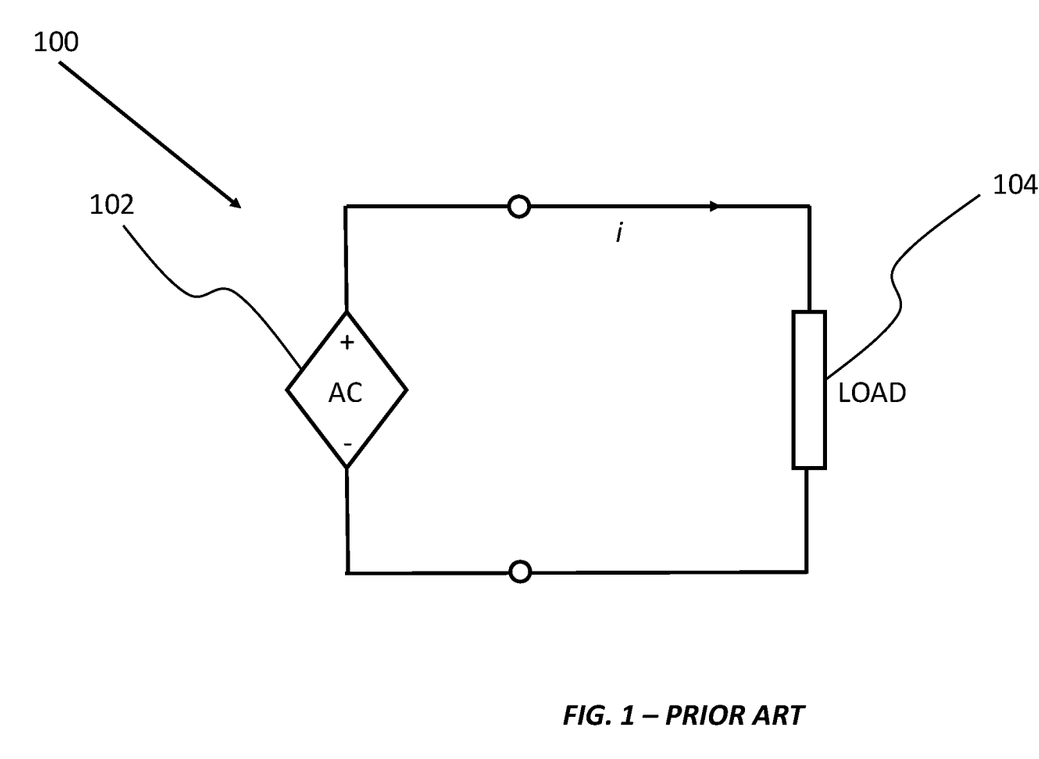
FIG. 1 shows a typical serial linear circuit.

A typical linear circuit 100 (power conversion system) is shown in FIG. 1. The circuit includes an oscillator (AC power source, bidirectional in general) 102 and one or more loads 104, which may contain resistances, and/or inductances, and/or capacitances, and/or voltage sources, and/or current sources. The oscillator has a first harmonic of the form of $V_s=V_{m1} \sin(\omega_o t)$. The first harmonic of the current is given by $i=I_{m1} \sin(\omega_o t+\phi_1)$. The phase $\phi_1$ is defined by the reactivity of the circuit, $V_s$ defines the source voltage, and $I_{m1}$ and $V_{m1}$ define maximal current and voltage, respectively.

Hereinafter, when circuit current and voltage signals are discussed, all refer to the first harmonic of these signals, even if not specifically indicated.

Figure 2:
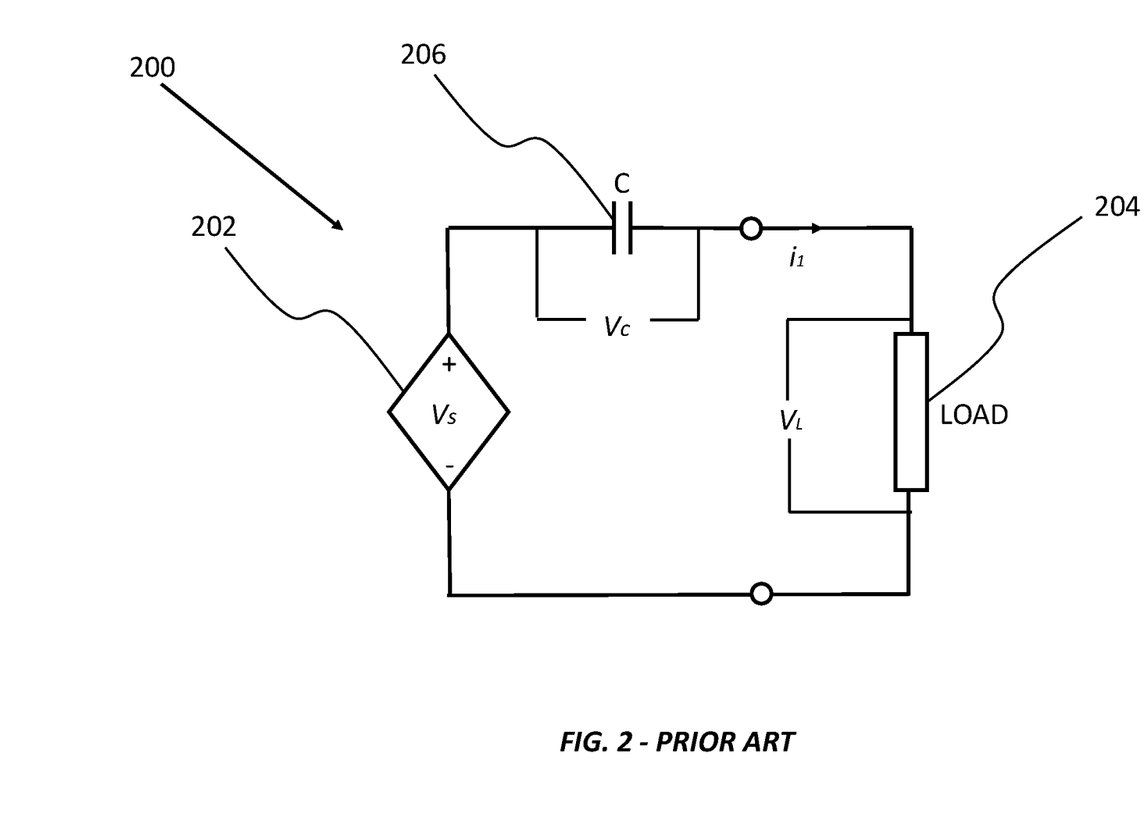
FIG. 2 shows another typical serial linear circuit.

FIG. 2 shows another typical serial linear circuit 200 (power conversion system). Circuit 200 is similar to the circuit 100 of FIG. 1, however, with the addition of serial capacitor C. In this case, the first harmonic of the of oscillator 202 is again $V_s=V_{m1} \sin(\omega_o t)$. The first harmonic of the load voltage $V_L$ is therefore $$V_L = V_S - \frac{1}{C}\int i dt,$$

where $i(t)=I_{m1} \sin(\omega_o t+\phi_1)$. $I_{m1}$ defines the maximal first harmonic intermittent current. Therefore:

$$V_L = V_{m1} \sin(\omega_o t) + \frac{I_{m1}}{\omega_o C}\cos(\omega_o t + \phi_1) \quad (1)$$

The concept of virtual impedance enables the elimination of one or more physical reactive components from a typical linear circuit, and replacement of the eliminated reactive components by a modification to the phase and/or the amplitude of the AC power source.

Figure 3A:
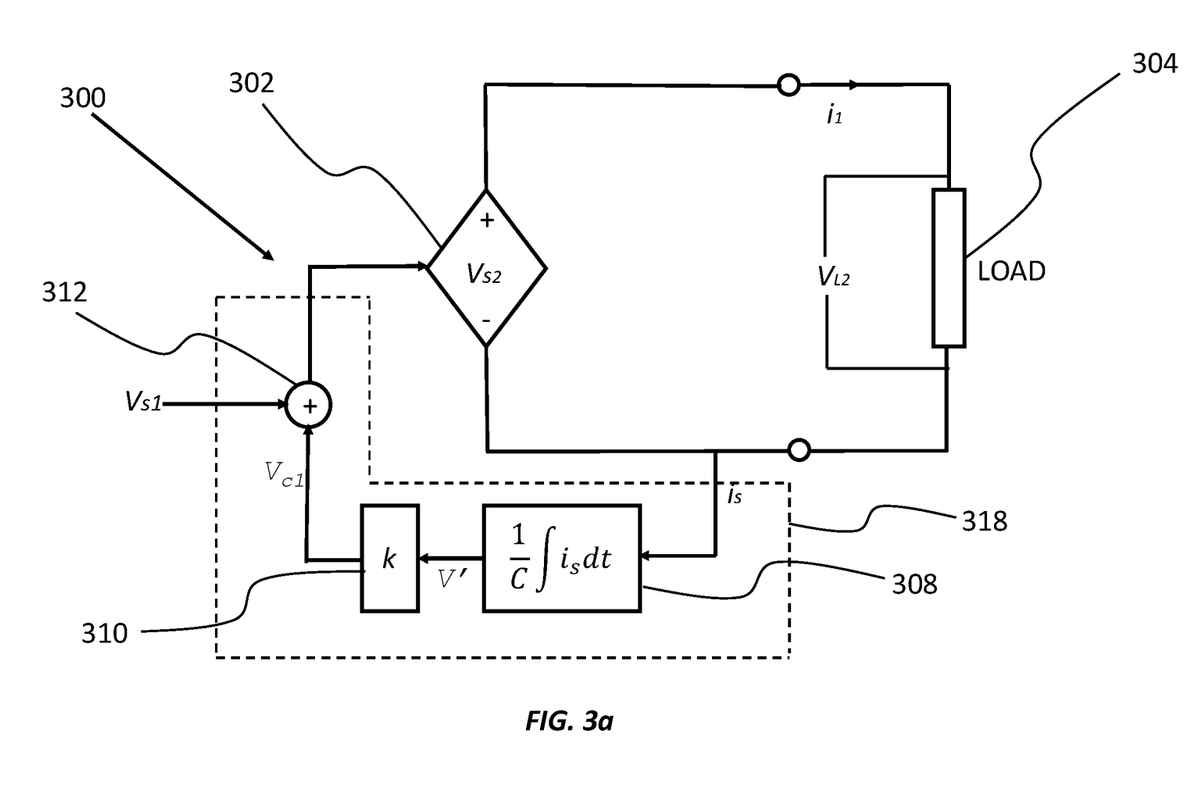
FIG. 3a shows a power conversion system similar to the system of FIG. 2, however, with a virtual-impedance creation loop which eliminates a necessity for additional variable components to compensate for fluctuations.

FIG. 3a shows a system similar to the system of FIG. 2 (similar numeral indications refer to similar components). The system of FIG. 3a shows how the serial capacitor 206 of FIG. 2 can be eliminated from the circuit by the introduction of a "virtual impedance", which causes the load 204 to receive exactly the same conditions (in terms of voltage, current, and relative phase) as the load 204 receives in the circuit 200 of FIG. 2 containing the physical serial capacitor C. The current $i_s$, which is a sample of the main current $i_1$ is integrated by the integration unit 308, to form a voltage V' which is in fact proportional in voltage to the voltage drop on the capacitor C of FIG. 2 (and of a same phase). As the sampling-current $i_s$ is in fact smaller than the main current $i_1$ that flows in the main circuit 200, the output voltage V' from the integration unit 308 is scaled by a constant k by scaling-block 310, to reflect a voltage level $V_{c1}$ which is in fact identical to $V_c$ in the circuit 200 of FIG. 2. The alternating voltage $V_{c1}$ is then summed by summation unit 312 with the AC voltage $V_{s1}$ (which in itself is identical to the original voltage $V_s$ of the power source 202 of FIG. 2). Therefore:

$$V_{s1} = V_s = V_{m1}\ \sin(\omega_o t) \quad \text{[same as } V_s \text{ of FIG. 2]} \tag{2}$$

$$V' = \frac{1}{C}\int i_s(t)dt = \frac{I_{ms}}{\omega_o C}\cos(\omega_o t + \phi_1); \tag{3}$$

$$V_{c1} = k\frac{I_{ms}}{\omega_o C}\cos(\omega_o t + \phi_1) = \frac{I_{m1}}{\omega_o C}\cos(\omega_o t + \phi_1); \tag{4}$$

it can be seen that the voltage $V_{c1}$ is the same as the voltage $V_c$ over the capacitor C of FIG. 2;

$$V_{s2} = V_{s1} + V_{c1} = V_{m1}\ \sin(\omega_o t) + \frac{I_{m1}}{\omega_o C}\cos(\omega_o t + \phi_1); \tag{5}$$

and, as in the circuit 300 $V_{s2}=V_{L2}$, it becomes clear that the voltage over the load 304 is:

$$V_{L2} = V_{m1}\ \sin(\omega_o t) + \frac{I_{m1}}{\omega_o C}\cos(\omega_o t + \phi_1). \tag{6}$$

As equation (6) is exactly the same as Equation (1), it becomes clear that the circuit 300 of FIG. 3a, which does not include the physical capacitor C of FIG. 2, is equivalent to the circuit 200 of FIG. 2 in terms of the voltage drop $V_{L2}$ on the load 304. More specifically, $V_{L2}=V_L$ in amplitude, shape, frequency, and phase. Therefore, the impedance of capacitor C of the circuit 200 of FIG. 2 is virtually replaced in circuit 300 by a "virtual impedance" of exactly the same impedance as the impedance of the physical capacitor C of FIG. 2. This elimination of physical capacitor C is in fact obtained by the manipulations 308, 310, and 312 within the virtual-impedance creation loop 318 of the circuit 300 of FIG. 3a.

The example of FIG. 3a shows how a virtual impedance can replace a physical component in a circuit. In fact, a virtual impedance can replace any type of component, even a combined network of physical components, as long as the details of the desired one or more physical components are known or can be determined. Moreover, a virtual impedance can even replace a desired "negative capacitor", as follows:

Parameters fluctuations of components in a circuit may clearly require the introduction of either a physical capacitor (as described above in FIG. 2), or an inductor. If a capacitor is added, the effect of the voltage of the additional capacitor is:

$$V' = \frac{1}{C}\int i_s(t)dt = \frac{I_{ms}}{\omega_o C}\cos(\omega_o t + \phi_1) \tag{7}$$

On the other hand, if an inductor is added, the effect of the induction addition is:

$$V' = L\frac{di}{dt} = \omega_o L I_{ms}\ \text{Cos}(\omega_o t + \phi) \tag{8}$$

A comparison between equations (7) and (8) shows that while equation (7) significantly decreases current "noise" components (as $\omega_o C$ is in the denominator of the equation), equation (8) very significantly increases any "noise" component that may appear in the current (as $\omega_o L$ appears at the nominator of equation (8)). This is significant in the case of high-frequency power conversion circuits, as $\omega_o$ is a relatively large component. Therefore, this observation leads to the conclusion that an addition of a capacitive component which involves integration of the current is always preferable over the addition of an inductive component in the circuit. Clearly, fluctuations in the circuit may require the addition of either a capacitive component, or an inductive component (the latter is clearly less preferable due to differentiation operator involved). It can be shown that theoretically, a negative capacitance could have replaced any additional inductance in the circuit. However, a negative capacitance does not exist in nature. More specifically:

When adding a conventional (positive) capacitor (denoted as $C_+$) the voltage over the added capacitor is:

$$V_{C+}(t) = \frac{1}{C_+}\int i_s(t)dt = -\frac{I_{ms}}{\omega_o C_+}\cos(\omega_o t + \phi_1); \tag{9}$$

[Similar to equation (7)];
Note the negative magnitude of the harmonic term in (9). When adding an induction L to the circuit, the voltage over the inductor is:

$$V_L(t) = L\frac{di}{dt} = \omega L I_m\ \text{Cos}(\omega_o t + \phi); \tag{10}$$

[Similar to equation (8)]
Note the positive magnitude of the harmonic term in (9). If a negative capacitor (denoted $C_-$) could have been added to the circuit, the voltage over this negative component could have been:

$$V_{C-}(t) = \frac{-1}{C_-}\int i_s(t)dt = \frac{I_{ms}}{\omega_o C_-}\cos(\omega_o t + \phi_1); \tag{11}$$

Looking at equations (10) and (11), they can become identical if:

$$\omega L = \frac{1}{\omega C_-};\ \text{or if:}\ C_- = -\frac{1}{L\omega^2} \tag{12}$$

Equation (12) shows that a use of an additional negative capacitor could have been much superior over the use of an additional inductor, as in the case of an inductor, the derivation of the current leads to $\omega L$ in the nominator, which means a significant intensify of any current noise component in a high frequency. On the other hand, in a case of a "negative capacitor", the integration of the current leads to $\omega^2 L$ in the denominator, which very significantly reduces any high-frequency current component. Unfortunately, a negative capacitor does not exist in nature. However, a value of a "negative capacitor", to replace an inductor, can easily be emulated by means of the virtual-impedance creation loop 318 of the circuit of FIG. 3a, as described above. More specifically, a negative capacitor which emulates an inductor can be obtained by a substitution in the integration unit 308 the value of:

$$C_- = -\frac{1}{L\omega^2} \quad (13)$$

Where L is the desired additional inductor, and C. is the value of the negative physical capacitor that, if existed, should have virtually replaced this desired additional inductor. Fortunately, and as noted, the virtual-impedance creation loop of the invention can easily overcome this drawback of nature, by emulating a virtual negative capacitor.

As can be noted from FIG. 3a, the virtual-impedance creation loop 318 of the invention requires a substitution of a value C in the integration unit 308 of the virtual-impedance creation loop. This value of C can be determined relatively easily in a conventional manner, as is done in the calculations of the prior art systems for compensating for components parameters fluctuations. For example, if the high-frequency power conversion system 300 is designed to operate in resonance, however, it is determined that it deviates from the resonant frequency by some degree, the value of the substituted C is the value of a physical capacitor that if added, would return the circuit to resonance. In a similar manner, the substituted C may be the value that will return the circuit to its designed controlled factor (such as one of the circuit-current, the voltage on the load, or the phase difference between the load and the AC source).

As shown, and in order to compensate for fluctuations in a high frequency power conversion system, the use of the virtual-impedance creation loop 318 can emulate not only replacement capacitors, but also replacement inductors (by their more preferable emulation of negative capacitors). It should also be noted that the circuit design may include one or more constant components as a part of the design, while the virtual component may compensate only for the difference due to the fluctuations.

Figure 3B:
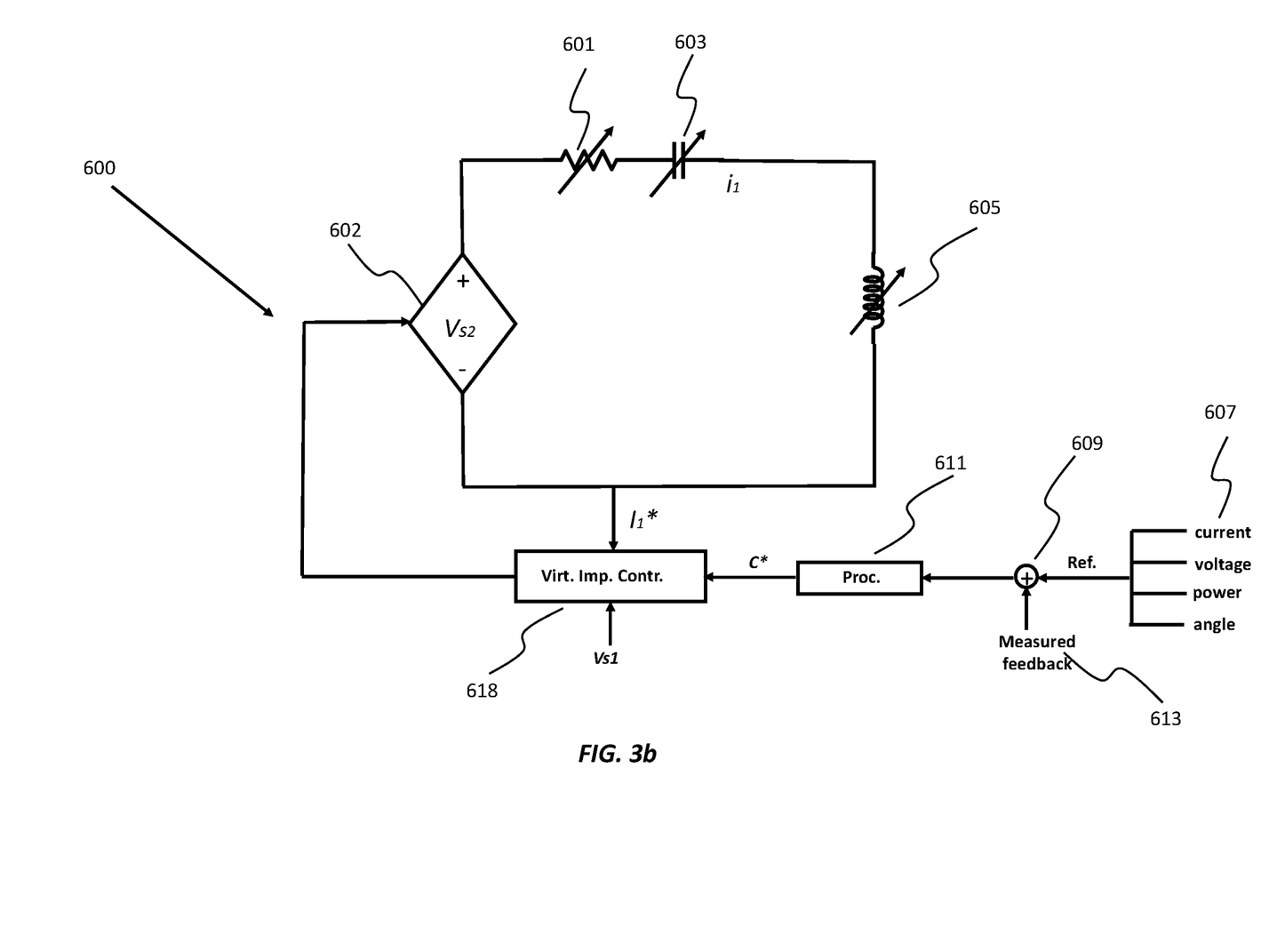
FIG. 3b shows a high-frequency power conversion system according to another embodiment of the invention.

FIG. 3b shows a high-frequency power conversion system according to another embodiment of the invention. As before, the system includes an oscillator 602 whose voltage amplitude and phase are controlled by a virtual impedance controller 618 (similar in its function to the virtual-impedance creation loop 318 of the circuit 300 of FIG. 3a). The varying components, namely resistor 601, capacitor 603, and inductor 605 reflect equivalent components of the circuit, one or more of them, in combination may reflect the load. Moreover, inductor 605 may reflect, among others, one or more transformers. The resistor 601 may fluctuate between values of $R_n \pm \Delta R$, the capacitor 603 may fluctuate between the values of $C_n \pm \Delta C$, and the inductor 605 may fluctuate between the values of $L_n \pm \Delta L$. Reference signal for controlled variable value 607 may be selected from one of: certain current, certain voltage, certain power, or phase difference between certain voltage and certain current. A reference signal for the controlled variable is provided into summing unit 609, which also receives real-time measured input (measured feedback 613) of the selected controlled variable. Fluctuations of components parameter values typically deviate the controlled variable from its reference 607. The resulting sum (or difference) between the defined factor and the actual real-time measurements is provided into processor 611, which in turn calculates a desired value of C* (either positive or negative). This is in fact the value of C which appears in the integration unit 308 of FIG. 3a. This is also the value of C that is provided into the virtual impedance controller 618 (equivalent to the virtual-impedance creation loop 318 of FIG. 3a). Virtual impedance controller 618 also receives the value of $V_{s1}$, i.e., the steady state voltage of the oscillator, and a sample $i_I$ of the circuit current, and from all these values controller 618 calculates a new amplitude and phase $V_{s2}$. This corrected output and phase of $V_{s2}$ regulates the output variable back to its reference, without adding any physical component. The value of k (unit 310 of FIG. 3a) can be easily determined, as it is the sampling factor between $i_I$ and $I_s$.

EXAMPLES

An inductance-based power conversion network is widely used in a variety of applications, for example, in levitation-melting systems, or in induction-based charging systems. Both of these systems are characterized by having a non-direct (such as, a transformer) connection between the load and the primary circuit where the power source is located. In the case of a levitation-melting system, there is an output coil, where the load, i.e., the metal which is subjected to the process in fact forms the secondary of the load.

As also noted, there is a variety of induction-based power conversion applications, including the "levitation system" and "charging system" mentioned above, in which the value of the equivalent induction of the circuit fluctuates in time. For example, in the levitation system, the metals that are subjected to the levitation-melting process in fact form a core of the transformer (or coil). Due to the nature of the melting-levitation process, significant dynamics takes place within the operational space, including movement of the subjected metals, resulting in an inductance change of the transformer. In view of this inductance change, the circuit is no longer in resonance, resulting in power losses. A similar situation occurs in the wireless charging system for vehicles, where the vehicle itself, which is made of metal, forms in fact the core of the power transmitting transformer. The change of position and orientation of the vehicle with respect to the transformer causes an inductance change, which in itself removes the circuit from resonance.

Figure 4A:
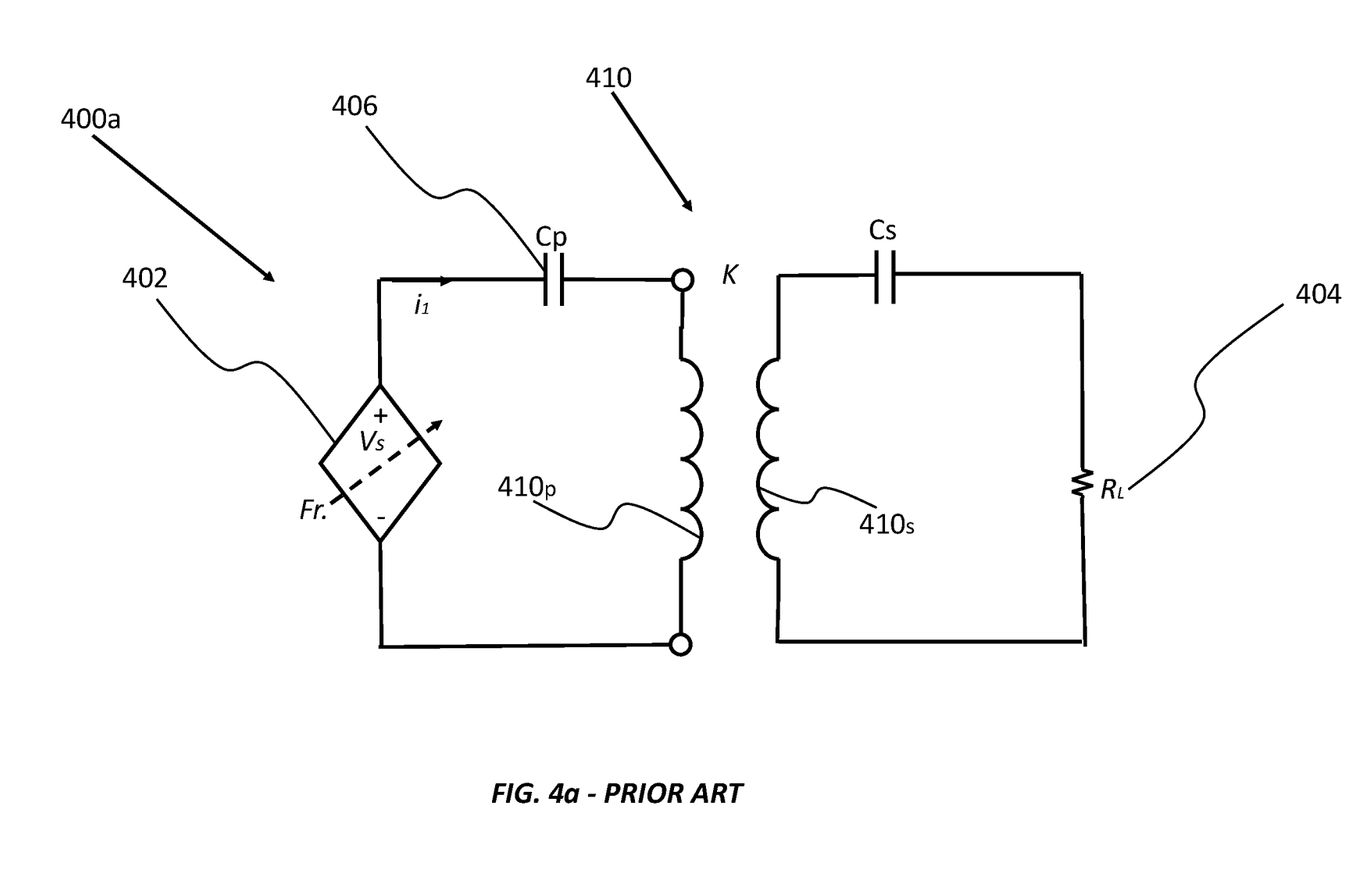
FIG. 4a shows a principle induction-based power conversion system of the prior art.
Figure 4B:
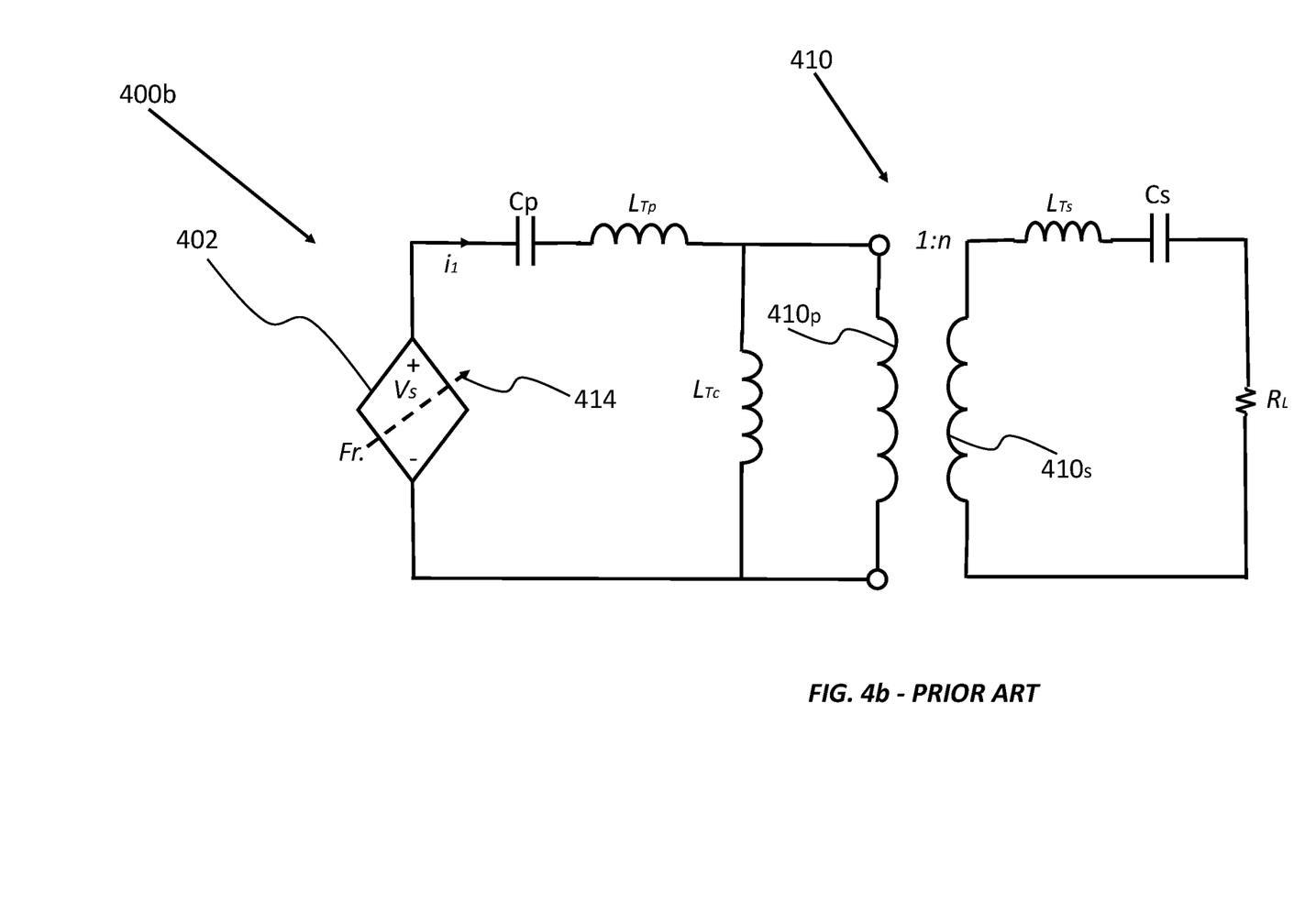

FIG. 4a shows a principle induction-based power conversion system 400a of the prior art. Typically, in its simplest form, the system includes a high-frequency oscillator 402, a transformer 410 (having a primary side 410p and a secondary side 410s, with a coupling coefficient K), a load 404 (indicated as resistor $R_L$, assuming it has a resistive nature), and a compensating capacitor 406. There are a variety of power conversion systems that are designed to transfer power in the order of milliwatts to megawatts. In order to allow use of a relatively small-dimension of components, the high-frequency oscillator 402 operates typically in a frequency in the order of tens of Kilohertz. To provide high efficiency of power transfer to only the resistive portion of the load, the circuit is designed to operate in a resonant frequency such that one or more of capacitors $C_p$ and $C_s$ are provided at the primary and secondary circuit, respectively, to cancel reactive impedance components at the primary and the secondary circuits, respectively. FIG. 4b shows an equivalent circuit 400b of the principle circuit 400a of FIG. 4a. Inductor $L_{TP}$ indicates the induction of the primary of the transformer 410, inductor $L_{Ts}$ indicates the induction of the secondary of the transformer 410, and inductor $L_{TC}$ indicates the induction of the core between the primary and the secondary coils of the transformer. As noted, there are applications in which the impedance of one or more of said inductors fluctuate, causing the circuit to go out of resonance, thereby resulting in a significant reduction of efficiency. As noted, the prior art suggests returning the circuit back to resonance by modifying the frequency of oscillator 402, as indicated by arrow 414. However, as the power source oscillator may generate very high power, regulations in many countries significantly limit the extent of its frequency change, or even entirely prohibit such a frequency change, resulting in a compromise of efficiency.

Figure 5:
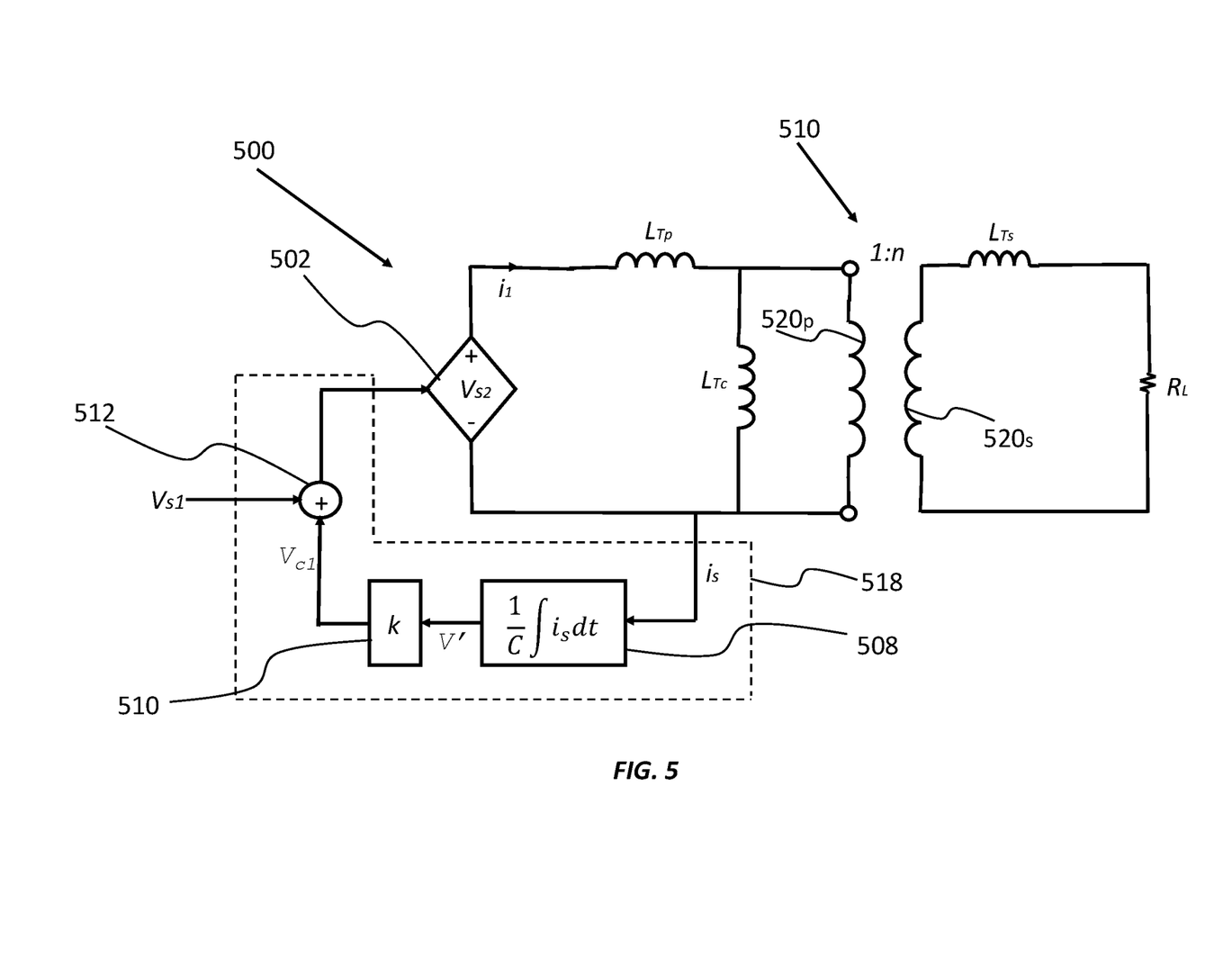
FIG. 5 shows an induction-based power conversion system, according to an embodiment of the present invention.

FIG. 5 shows an induction-based power conversion system, according to an embodiment of the present invention. Similar components appearing in different figures indicate a same functionality, therefore, and for the sake of brevity, these components, as well as their functionalities will not be repeated herein in details. When compared to the prior art circuit of FIG. 4, three main differences can immediately be observed, as follows: (a) the physical capacitors $C_p$ and $C_s$ that have been used in in the circuit of FIG. 4b to compensate for the induction-type impedance have been eliminated in the system of FIG. 5; (b) The system of FIG. 5 contains a virtual-impedance creation loop 518, similar to the loop in the circuit of FIG. 3a, that in practice replaces the impedance of the physical capacitors $C_p$ and $C_s$; and (c) The frequency of the power source oscillator of the system of FIG. 5 is fixed, and does not have to be adjusted to compensate for fluctuations in inductions within the circuit.

More specifically, the system of the present invention uses a "virtual impedance" of a capacitance-type to compensate for the inductions in the circuit, and to maintain the circuit in resonance, even upon fluctuation in the circuit inductions. The virtual impedance which is used in the induction-based power conversion system of the present invention is significantly advantageous over systems of the prior art, as follows: (a) It eliminates the necessity to modify the frequency of the power source oscillator 502 in order to return the circuit to resonance. Such a modification of frequency is against regulations in many countries, particularly in view of the high-power involved; (b) It eliminates the necessity to use physical capacitors, while changing the phase and/or amplitude of the power source oscillator instead; and (c) The virtual-impedance creation loop 518 can account for any value of capacitance, either positive or negative. Prior art systems that do not apply modification of the power source frequency, cannot compensate for induction fluctuations, when a negative capacitor is necessary.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A high-frequency resonant power conversion system for transferring power from an oscillator to a load or vice-versa, the system comprising components with at least one fluctuating parameter and is configured to control a predefined level of a variable selected from: a certain current, a certain voltage, a phase difference between a specific voltage and a specific current, and a certain power; the system further comprising a virtual impedance creation loop which is configured to create a virtual component, said virtual component forming a basis for changing amplitude and/or phase of the oscillator, thereby to compensate for a deviation of the selected controlled variable from said predefined level due to said at least one fluctuating parameter;

wherein said virtual impedance creation loop comprising a processor for calculating, based on said predefined level of the selected variable and on circuit measured values, a positive or negative capacitance value, that when added to the system, returns the system to the predefined level of the selected variable; and wherein said virtual impedance creation loop comprising an integration unit having the form $1/c \int i_s dt$, wherein C is said calculated positive or negative capacitance value, and said $i_s$ is a sampled current from the system, and a result of an integration performed by said integration unit is a voltage also forming the basis for changing the amplitude and/or phase of the oscillator.

2. The high-frequency resonant power conversion system of claim 1, wherein a phase difference between the oscillator and the load is constant or follows a specific reference, to provide operation of the system in a desired mode of operation.

3. The high-frequency resonant power conversion system of claim 1, wherein said created virtual component is a virtual capacitor.

4. The high-frequency resonant power conversion system of claim 1, wherein said virtual impedance creation loop comprising an integration unit.

5. The high-frequency resonant power conversion system of claim 1, wherein the system is an inductive or capacitive-coupling based system.

6. The high-frequency resonant power conversion system of claim 1, wherein said load is an induction-based levitation system.

* * * * *